(12) United States Patent
Antoine et al.

(10) Patent No.: US 6,856,947 B2
(45) Date of Patent: Feb. 15, 2005

(54) OPTIMISED BIT ALLOCATION ADAPTED FOR VDSL

(75) Inventors: Philippe Antoine, Walhain (BE);
Thierry Pollet, Mechelen (BE);
Francois Alain Roger Deryck, Wahlhain-Saint-Paul (BE); Luc Vandendorpe, Louvain-La-Neuve (BE);
Pieter Geeraerts, St-Martens-Latem (BE)

(73) Assignee: Alcatel, Paris (FR)

( * ) Notice: Subject to any disclaimer, the term of this patent is extended or adjusted under 35 U.S.C. 154(b) by 88 days.

(21) Appl. No.: 10/336,815

(22) Filed: Jan. 6, 2003

(65) Prior Publication Data

US 2003/0130824 A1 Jul. 10, 2003

(30) Foreign Application Priority Data

Jan. 7, 2002 (EP) .............................................. 02360001

(51) Int. Cl.⁷ ............................................. G06F 15/00
(52) U.S. Cl. ...................................... 702/189; 375/254
(58) Field of Search ................................. 702/110, 111, 702/119, 123, 183, 184, 186, 189, 191, 193, 194, 195, 197, 199; 713/300; 375/225, 231, 260, 261, 254; 370/206, 210, 252, 341; 714/704, 746

(56) References Cited

U.S. PATENT DOCUMENTS

| | | | | | |
|---|---|---|---|---|---|
| 5,373,460 | A | * | 12/1994 | Marks, II | 708/300 |
| 5,495,483 | A | * | 2/1996 | Grube et al. | 370/341 |
| 5,521,906 | A | * | 5/1996 | Grube et al. | 370/252 |
| 6,005,893 | A | * | 12/1999 | Hyll | 375/260 |
| 6,128,348 | A | * | 10/2000 | Kao et al. | 375/260 |
| 6,134,273 | A | * | 10/2000 | Wu et al. | 375/261 |
| 6,205,410 | B1 | * | 3/2001 | Cai | 702/191 |
| 6,366,554 | B1 | * | 4/2002 | Isaksson et al. | 370/206 |

(List continued on next page.)

OTHER PUBLICATIONS

Sonalkar R V et al: "A novel bit and power allocation algorithm for duplex operation of DMT based on DSL modems" Signals, Systems, and Computers, 1999. Conference Record of the Thirty–Third Asilomar Conference on Oct. 24–27, 1999, Piscataway, NJ USA, IEEE, US, Oct. 24, 1999, pp. 690–694, XP010374067.

(List continued on next page.)

*Primary Examiner*—Donald E. McElheny, Jr.
*Assistant Examiner*—Mohamed Charioui
(74) *Attorney, Agent, or Firm*—Sughrue Mion, PLLC

(57) ABSTRACT

The invention relates to a modem and a method for providing bit loading computation in a multi-carrier communication system, using a plurality of simultaneous different carriers or tones by measuring the signal to noise ratios (SNRs) for carriers and by determining in dependence of the SNR a related number of bits to be allocated to the respective carrier. The method comprises the steps of providing a sliding window having a frequency width able to contain a predetermined number of the carriers, moving the sliding window over the frequency spectrum of the carriers through a plurality of positions of the window with respect to the carrier frequencies, and when the window contains the predetermined number of the carriers and there is at least one further carrier to be positioned in the window as a new carrier for bit allocation, the window is moved such that on entering a new carrier into the window at one of its borders, a carrier already in the window at the other frequency border leaves the window. For each position of the window determining bit allocation for the respective at least one carrier, and in the event that a predetermined average power spectrum density threshold (TPSD) of the carriers over the window for the present window position is not respected, selecting at least one carrier within the window for power spectrum density reduction.

10 Claims, 1 Drawing Sheet

U.S. PATENT DOCUMENTS

| | | | |
|---|---|---|---|
| 6,580,752 B1 * | 6/2003 | Amrany et al. | 375/225 |
| 6,674,795 B1 * | 1/2004 | Liu et al. | 375/231 |
| 6,732,281 B1 * | 5/2004 | Mantri et al. | 713/300 |
| 2002/0041637 A1 * | 4/2002 | Smart et al. | 375/316 |
| 2002/0108081 A1 * | 8/2002 | Mitlin et al. | 714/746 |
| 2002/0176509 A1 * | 11/2002 | Gatherer et al. | 375/260 |
| 2003/0020983 A1 * | 1/2003 | Cai et al. | 359/124 |
| 2003/0026201 A1 * | 2/2003 | Arnesen | 370/210 |
| 2003/0097623 A1 * | 5/2003 | Razavillar | 714/704 |

OTHER PUBLICATIONS

Chow P S et al: "A Practical Discrete Multitone Transceiver Loading Algorithm for Data Transmission Over Spectrally Shaped Channels" IEEE Transactions on Communications, IEEE Inc. New York, US, vol. 43, part 2, No. 2/4, Feb. 1, 1995, pp. 773–775, XP000502585.

* cited by examiner

OPTIMISED BIT ALLOCATION ADAPTED FOR VDSL

BACKGROUND OF THE INVENTION

The invention is based on a priority application EP 02360001.8, which is hereby incorporated by reference.

The invention is related to a method for providing bit loading computation in a multi-carrier communication system, using a plurality of simultaneous different carriers (tones), the method comprising measuring the signal to noise ratios (SNRs) for carriers and determining based on the SNR, a related number of bits to be loaded (allocated) to the respective carrier.

The invention relates also to a device, particularly a modem.

TECHNICAL FIELD

The technical field of the invention is bit loading (the same as bit allocation) computation in multi-carrier systems.

Such computation is used e.g. during the initialisation of an ADSL (Asymmetrical Digital Subscriber Line) or VDSL (Very high speed Digital Subscriber Line) point-to-point connection. The following discussion refers to one known form, namely using Discrete MultiTone (DMT) modulation. However, the invention is not restricted thereto. ADSL and VDSL are multi-carrier systems.

Multi-carrier systems modulate data on a large number of (orthogonal) narrow band carriers or tones. Each carrier or tone is modulated with a QAM (Quadrature Amplitude Modulation) as a QAM constellation point for the duration of a multi-carrier symbol. In the transmitter all carriers are then summed to build up the complete symbol. In the receiver the carriers are separated and demodulated. Modulation and demodulation of a DMT symbol can be implemented very efficiently by the use of an Inverse Fast Fourier Transform (IFFT) and Fast Fourier Transform (FFT), respectively.

In DMT-based ADSL (Asymmetrical Digital Subscriber Line), for which a standard exists, 256 carriers span a frequency band of 1.104 MHz, but it is not possible to use all carriers. (Below tone 6, bandwidth is reserved to the plain old telephone system (POTS), and some of the carriers (tones) are used for upstream, and some for downstream.) Bit loading for ADSL has to be made such that the average Power Spectrum Density (PSD) average over the complete spectrum is compliant with a "PSD mask". Further, a ripple (2.5 dB) is allowed on top of the PSD mask. The PSD is the sum of the powers (measured e.g. in Watt) of the carriers within a specified frequency range, divided by the width (measured e.g. in Hz) of that frequency range.

In DMT-based VDSL (Very high speed Digital Subscriber Line), for which a binding standard does not yet exist, the experts are working on the basis that up to 2783 carriers can be used, spanning a frequency band up to 12 MHz. The tone spacing is 4.3125 kHz (the same as for ADSL). Thus a frequency band of 100 kHz covers 23 different tones each distant from the neighboured tone by 4.3125 kHz. This band of 100 kHz plays a role in a preferred variant of the invention to be described later. For VDSL, the mentioned ripple is also allowed. Whereas bit allocation or bit loading for ADSL can be made for the whole band for VDSL additional difficulties exist for the following reasons: It is not sufficient to fulfil the PSD requirement (a maximum power and average PSD over the complete spectrum of carrier frequencies may not be exceeded), as in ADSL, but in addition to that requirement, a PSD average over 100 kHz has to be within prescribed limits, and this for each position of a range or window of a width of 100 kHz in any possible position within the range of carrier frequencies. This means that for VDSL the 100 kHz average criterion must be fulfilled for any arbitrary position of the frequency window. Therefore, methods for bit allocation for ADSL are not necessarily applicable for VDSL.

At system start-up and before data can be transmitted in a xDSL (including ADSL and VDSL) system over the line, an initialisation procedure is executed to initialise the modems at each end of the line. Each modem comprises a sending part and a receiving part. One modem uses a set of carriers which are the carriers to be received by the other modem, and the first mentioned modem uses for receiving a set of carriers different from those used for sending. Besides other measures to be performed during the initialisation each modem with its receiving part measures the SNR (Signal to Noise Ratio) for each carrier frequency.

Bit loading computation is performed for determining for each carrier of the xDSL spectrum and according to measured SNRs the maximum number of bits that can be transported between a transmitter and a receiver. For VDSL, a maximum of 15 bits for a carrier is allowed. It is an aim of bit allocation to maximise the number of bits in a special frequency band without of course exceeding the maximum power and average PSD allowed.

Particularly, the modem which is measuring the SNRs of the different carrier frequencies may receive from the other modem the carrier frequencies sent with a certain power and loaded with bits in a known manner. It should be understood that the carriers do not appear with their original relative low frequency, e.g. 4.3125 kHz, on a line connecting the two modems of the xDSL point-to-point connection, but the carrier frequencies have been shifted to a higher frequency range for transmitting over the line (which is normally a copper line).

In the modem performing the known SNR measurement, at first the SNRs for (preferably) each carrier are measured and stored in a memory. After that, the bit loading is computed. The higher the SNR for a special carrier, the more bits can be loaded.

For the following description it should be noted, that multiplying or dividing an electric power (expressed e.g. in Watt) by 2 does not exactly correspond to steps of +3 dB and −3 dB, respectively, but more exact values are +3.0103 dB and −3.0103 dB, respectively, which is known to the experts. The exact value is (+or −) 10×log 2 [dB]. Thus, the expert will replace the steps of multiples of 3 dB (e.g. 9 dB−6 dB−3 dB) used herein for the purpose of simplification, with more exact values, when necessary.

If it is supposed that for a SNR of 9 dB normally 3 bits can be loaded, for a SNR of 6 dB normally 2 bits can be loaded, and for a SNR of 3 dB normally 1 bit can be loaded, then for a SNR of 6.5 also only 2 bits can be loaded, and the minimum value of a SNR necessary for 2 bits is exceeded by 0.5 dB. It is known to reduce in such a case the power of an amplifier, which delivers the carrier frequency, such that the SNR approaches (as near as technically reasonable) the required SNR of (in this example) 6 dB. Thus the power of this carrier and the average PSD (Power Spectrum Density) is kept as low as possible. This is usual practice in bit allocation. In another case, for a carrier a SNR of 8.5 dB might be measured and also to this carrier only 2 bits can be loaded since the SNR of 9 dB necessary for 3 bits is not reached. Now it is also known to boost (i.e. to increase) the power of the last mentioned carrier such that a SNR of 9 dB is reached and, therefore, 3 bits can be loaded instead of only 2. However, by such measure the maximally allowed average PSD might be exceeded.

Removal of a bit from a carrier as such does not influence the PSD or average PSD, if not the power of that carrier is reduced accordingly, namely in such a way that the power of that carrier is, from a technical point of view, and probably including some safety for taking into account fluctuations in noise, such that the power and SNR is just sufficient for the reduced number of bits. The same applies of course, if the number of bits is increased, in which case the power must be increased accordingly. This reducing or increasing the power of the carrier in accordance with a change of the number of bits of the carrier is not mentioned in the further discussion, but it should be appreciated that such correction of the power has to be made in any case, preferably near to the time when the number of bits is changed. Thus, in the discussion made here and in the calculations for allocating bits, a carrier is regarded to have said just sufficient power and SNR for the present number of the bits of that carrier.

A carrier may totally be omitted, i.e. its power and number of bits is set to zero. This might occur if the frequency of a carrier is subjected to strong noise, or if a carrier may cause interference with other services.

After for each carrier of the two modems the bit loading has been computed, and, where necessary it was computed how to boost (increase) the carrier power or how to decrease the carrier power, the data or tables of bit loading and power for each carrier are exchanged with the other modem in order to instruct the other modem which carriers with which bit loading and power are to be used.

For ADSL, an overall (over the whole bandwidth) optimization is known which uses the following principles: for all carries all possible numbers of bits and corresponding power are calculated and the best combination (which delivers the maximum of allocated bits) is selected.

The calculation process in known systems requires high computational work, especially taking into account the high number of carriers in VDSL (compared to ADSL) and thus a need for higher processing speeds would be necessary which cannot be provided by certain processors used in modems today.

It would be useful to find a calculation method which is little complicated, and which, therefore, allows to be performed by computing elements (digital processors) with a relatively low computing ability, as they are used today in known modems.

SUMMARY OF THE INVENTION

It is an object of the invention to provide a simple method and efficient to perform for bit allocation, which method does not require high computational effort. Further, the result calculated by such method for the bit allocation should be usable in practice, that means it should be not too far from the correct result of bit allocation obtainable by a complex calculation requiring much more computational effort. Usage of a very long time for computation should be avoided.

This object is achieved according to the first aspect of the invention in that the method comprises the steps of:
a) providing a sliding window having a frequency width able to contain a predetermined number of the carriers,
b) moving the sliding window over the frequency spectrum of the carriers through a plurality of positions of the window with respect to the carrier frequencies, the movement being such that after a movement at least one new carrier is positioned in the window in the present position thereof and was not positioned in the window in the window position immediately before the present window position;
when the window contains the predetermined number of the carriers and there is at least one further carrier to be positioned in the window as a new carrier for bit loading, the movement of the window being made such that on entering a new carrier into the window at one of its frequency borders, a carrier already in the window at its other frequency border leaves the window;
c) for each position of the window determining bit allocation for the respective at least one carrier;
d) in the event that a predetermined average power spectrum density threshold (TPSD) of the carriers over the window for the present window position is not respected (and thus exceeded), selecting at least one carrier within the window for power spectrum density reduction at the expense of at least one bit.

An advantage of the invention is the relative simple calculation process, since the bit allocation has to be calculated for each position of the window for one (or few) carrier(s) only. The TPSD mentioned is herein also called the allowable PSD.

Though the invention was made with a view to VDSL, the invention is also applicable for other multi-carrier systems, e.g. for ADSL. Now the invention will be further discussed for VDSL. Thereafter, the application for ADSL will be discussed.

For VDSL in its form explained above, a 100 kHz wide window exists at least after what is called here a "start period" of the bit allocation (to be explained later). In this state, 23 carriers are in the window.

To the invention belong variants in which after each "shifting" of the window, that is after each change of the frequency range of carrier frequencies which are taken into account during the calculation of the bit loading, at least one "new" carrier (however much less carriers than are in the window) comes into the window at that side which is directed to the moving direction of the window whereas at the other side the same number of carriers (as the number of the new carrier(s)) leaves the window. For the new carrier(s) bit loading is computed.

In the following, a variant of the invention is discussed in which during each shift of the window only one new carrier comes into the window, and one carrier leaves the window. In such variants the calculation is easier than for the calculation of a plurality of new carriers. This might already reduce the necessary computational power, or from another point of view, reduce the necessary calculation time when using a special processor. An exception from the statement that exactly one carrier leaves the window, refers to the "start period" of the bit allocation and will be described later. The invention is further described for the example with only one new carrier for each shift of the window.

In this case, as just described, the bit allocation is calculated (partly by reading a table containing a SNR/bit-number relationship) only for the new carrier in the window using the already known SNR for that carrier. Further it is checked if the SNR of this carrier exactly fits to the calculated number of bits to be loaded, or if there is present an extra SNR (excess SNR over that SNR needed for the allocated bits) which is not yet used, or if by boosting the power of the carrier it would be possible to load a further bit on the carrier.

The invention covers variants in which it is possible to change carriers other than the new carrier in such a sense that the power of these other carriers or the bits loaded on any of these other carriers is increased; this would have the consequence that a window position which was calculated earlier and which is with respect to the present window position for example shifted back by five or ten carrier distances, might now have an average PSD which exceeds the allowable upper limit. In order to correct such a situation, it would be necessary to calculate again the earlier position and possibly all further positions. Thus, iterations would require additional calculation time. The fewer iterations are made, the quicker is the calculation.

Therefore, in a preferred modification of the invention, any change in the other carriers of the present window than the new carrier can be made only in such a sense that the number of bits and/or the power of the respective carrier is reduced; in this way, there is no danger that the PSD of an earlier window exceeds the allowed limit of average PSD.

This has the advantage that the window may be moved in one direction only and the process advances with relative great velocity, since iterations are excluded, and that the calculation time and thus the time needed for the initialisation is relatively well known in advance.

The direction of movement of the window plays a role. The upwards direction performs better. For each position of the window which is moved from the left to the right in the drawing (i.e. from lower to higher frequencies) the bit allocation of only the new carrier i.e. the rightmost one in the window has to be chosen. The bits for the other tones (22 tones) have already been allocated; they may be modified as described herein.

For the new carrier there is no restriction in which direction the power of the carrier or the number of bits can be changed. If this new carrier is boosted and its number of bits is increased, this will not affect the PSD of the last calculated window (in which window the new carrier was not present). If a corresponding correction in the negative sense (reducing number of bits of a carrier other than the new carrier and correspondingly reducing power of that carrier) equivalent to or greater than the just mentioned increase of power and number of bits of the new carrier is applied to any one of the other carriers of the present window, this is harmless in view of the fact that it does not increase the average PSD of an earlier window.

The invention allows different strategies for allocating a number of bits to the new carrier, for example: The number of bits which can be allocated to the new carrier depends on at least the following two conditions:

a) The allocated bits depend on the SNR of the new carrier. The SNR which is first taken into account is preferably that SNR which was measured for that carrier before the allocation of bits. That SNR can be changed by increasing or reducing the power of the new carrier.

b) The power and thus the PSD of the new carrier may not exceed a certain power specified by the mask to be observed or by comparable rules to be observed, and the average PSD within a specified width of a window may also not be exceeded according to the applicable standard or rules.

In order to find an optimum for the allocation of bits it is deemed to be advantageous to try to allocate more bits to the new carrier at least in some cases than are allowable in view of the originally measured SNR. This would include the following "provisional" bit allocation to the new carrier: if the available SNR is nearer to the number of bits which can be allocated in view of that SNR (i.e. the SNR is little higher than necessary), a just mentioned number of bits is allocated. A decision may be made for the just mentioned action if the available SNR is less than 1.5 dB higher than the necessary SNR. If the SNR is nearer to the next higher number of bits (which however can not be allocated since the SNR is not sufficient), one bit more is allocated, thus the present SNR is not sufficient for that number of allocated bits and the power of the new carrier has to be increased (or boosted) in order to increase the SNR of the carrier. The invention does also include variations where not only one additional bit may be allocated but a plurality of additional bits may be allocated in addition to a number of bits allowable in view of the original SNR of the carrier. In order to simplify the description, however, in the following only one additional bit is contemplated.

A decision for adding one further bit may be made if the available SNR is 1.5 dB or less lower than the necessary SNR. However, when performing the invention, it is possible to deviate from this decision limit in the middle between two necessary values of SNR for different numbers of bits. Particularly it is possible always to try an addition of a further bit to the new carrier.

After that provisional allocation of bits to the new carrier the method calculates if the limits to be observed, e.g. for the power of the new carrier and for the average PSD, are observed, i.e. not exceeded. This calculation can, within the scope of the invention, also be made in advance in that the method has calculated before that amount of additional average PSD which may be added by the new carrier without exceeding the allowed limits.

If the provisionally allocated number of bits for the new carrier (if necessary after corresponding change of the power of the new carrier), is allowable in view of the above mentioned conditions, according to a variant of the invention the allocation of bits to that just mentioned new carrier is deemed to be finished, the number of allocated bits and the power of the new carrier are stored, and the window is, if further new carriers are available, moved.

If such provisional allocation of bits has the result that the new carrier exceeds the power or PSD allowable for that new carrier, then the number of bits of the new carrier and the power are reduced by one bit which should lead to the fact that the power of the new carrier proper does not exceed the allowed limit. However, there is yet the possibility that the average PSD is exceeded.

If the average PSD is exceeded, at least one of the following steps of reducing another carrier than the new carrier by one bit and reducing the associated power of the carrier is executed in order to make sure that the allowed average PSD is not exceeded.

a) a1) After a new carrier has come into the window and after determining the number of bits to be allocated to the new carrier in view of its known SNR, it is checked if the average PSD is exceeded or not, wherein this check can, within the scope of the invention, also be made before, namely taking into account the carriers in the window without the new carrier and, before allocating a number of bits, checking what would be the highest possible number of bits which can be allocated to the new carrier without exceeding the allowed average PSD including the new carrier.

a2) If the average PSD is not exceeded, it is tried to add one further bit (accompanied of course by increasing the power of that carrier); it is not excluded in the invention, to add more than one bit to the new carrier.

b) If by the originally allocated number of bits according to preceding paragraph a1 (or by adding a further bit according to preceding paragraph a2) of the new carrier the allowed average PSD is exceeded, a variation of the inventive method tries to "swap" one bit: from a carrier (not the new carrier) within the window a bit (and corresponding power) is removed and one bit (and corresponding power) is added to the new carrier; the first mentioned carrier is selected such that the power removed from that carrier for one removed bit is greater than the power to be added to the new carrier for one additional bit. Since (if such a carrier can be found) the reduction in power of the carrier from which one bit was removed is higher than the necessary increase in power of the new carrier for allocating one more bit, by this measure the average PSD is reduced, possibly sufficiently reduced to lie within the allowed value. If the two carriers have e.g. 5 bits each (before swapping), and if the new carrier has a lower noise level than the other carrier, then removal of one bit from the other carrier (together with according removal of power) reduces the average PSD more than the additional power needed for the new carrier and thus will reduce the average PSD. In the case that the two carriers have the same noise level, the following rule can be applied: the carrier from which a bit is removed, must have at least two bits more than the new carrier. From the above it follows easily that in a case where the new carrier has a higher noise level than the other carrier, the other carrier must in all events have three or more bits in excess of the number of bits of the new carrier in order to allow swapping a bit with the consequence of reduction of average PSD.

An advantage is that the number of allocated bits is not reduced by this measure of swapping.

c) Further, it is possible to reduce at least one carrier (not the new carrier) by one bit without adding a bit to the new carrier, in order to bring in this way the average PSD into the allowed value.

d) A trade-off is preferably used to find the "best" carrier for reduction by one bit for the variants b or c (will be explained further below).

e) The number of bits of the new carrier is reduced step by step, if necessary to zero. By this measure, it should be possible to reduce the average PSD within the window to the allowed value.

The above possibilities are, according to the present opinion, preferably executed in the following order: a), b), c), d), e). As soon as an allowable value of average PSD is reached, but preferably not before a2 was tried, the process is preferably ended in order to execute the method as quickly as possible, and, nevertheless, getting a "good result" that is a result which is not too far from the optimum result obtainable by a more complicated and possibly more time consuming method of allocation of bits.

For this purpose, it has to be checked which carrier in the window can be reduced with respect to the number of bits and/or with respect to the carrier power. If the just reduction in power and/or bit number has been made appropriately, the increase in carrier and/or bit power of the last carrier in the window has been compensated for, and the PSD over the window does not exceed the allowable level.

In a preferred variant of the invention, there is provided a method step (and means in an apparatus according to the invention) for finding out which of the carriers other than the new carrier is the best one for reducing the power and/or the number of bits. A criterion has been defined to select the best tone to be decremented. This criterion is a trade-off between of the available PSD reduction and a number of next window positions that would benefit from this PSD reduction i.e. Max($A(J_1)$, $A(J_2)$), as explained using FIG. 2. For example, if the carrier to be changed in power or number of bits besides the new carrier is near to the left side border of the window, in the extreme case is the second carrier in the window, then reduction in power of this carrier can only affect that one next carrier which comes into the window on the next shifting of the window. This because no further carrier than the mentioned next carrier can be positioned in the same window together with the mentioned second carrier. If the carrier to be changed is relatively near to the new carrier, reduction in power of this carrier can influence a great number of further new carriers. Further, if a carrier was found for reduction in power, for which the reduction can be made by a great amount, by that carrier a greater number of further carriers not yet in the window can be affected compared with a case, where the reduction in power is such small that only one further carrier can benefit from this reduction. Benefit in this connection means that a reduction in power of one carrier in the present window allows increase in power of another carrier, which is not yet in the window.

If e.g. in the position of the window immediately before the present position, the carrier at the left (lower frequency) end of the window has a low power, then in the present position (in which that carrier is no more in the window) the average PSD might be raised compared with the earlier window, and might be remarkably higher than allowed. When now the number of bits for the new carrier in the present window is calculated based on the known SNR, and the power of that carrier is is reduced in order to have a good correspondence between the number of bits and the SNR, the power might nevertheless be thus high, that the allowed average PSD is exceeded.

It should be understood that the term sliding window describes the fact that according to the invention during the initialisation of the modem as described above, only those frequencies are taken into account during the allocation of bits which frequencies of carriers are within the window in the actual position of the window. After such measurement of SNRs has taken place and calculation of bit allocation has been made for this just mentioned position of the window, the window is "shifted" or "moved" until at least one "new" carrier which was in the position of the window immediately before the new position not within the window, has come into the window and a respective number of carriers at the other side of the carriers has left the window. Preferably, exactly one new carrier comes into the window in the new position, and then the next measurement of SNR is performed and the next bit allocation takes place, and so on.

The inventors believe that the best way for "moving" the window is continuous in one direction (in order to avoid iterations) and that further the best direction is from lower carrier frequencies to higher carrier frequencies. It is believed that the reason for the better performance is based on the fact that during bit allocation the noise is changed compared with the noise taken into account in the SNR measurement before the bit allocation, and that the negative influence on the performance of the system of such change of noise is lower if the window is shifted from lower to higher frequencies.

At the very beginning of the computation, it is preferable to start the window with a position in which only one carrier (in any case much less carriers than the maximum possible number) is positioned in the window in order to avoid an optimisation including many (23) carriers. For the preferred direction of movement from lower to higher carrier frequencies this first carrier would be that carrier which has the lowest frequency. Thus, the first computation can be made with only one carrier (or few carriers). From this first position, the window is moved until (according to the preferred variant) the second carrier is in the window, the calculation of bit allocation is made, and in a next step the third carrier comes into the window and so on. If in a system as described in the description of preferred embodiments, namely in the window width of about 100 kHz (corresponding to 23 carriers) the $23^{rd}$ carrier has come into the window, the above mentioned start period has ended. At latest now, the window has its width of 100 kHz. At a next movement of the window, the first carrier leaves the window and the $24^{th}$ carrier comes into the window.

During the start period, in contrast to the explanation just given, the window may be regarded and is realised in variations and embodiments of the invention as having a variable width. For accepting one carrier in the window, the window in an example has a width of about 4.3125 kHz, and for each further carrier to be taken up in the window its width is increased by 4.3125 kHz. This is realised preferably in that during the start period the left (lower frequency) border for the preferred "moving" direction of the window is not moved but held below the frequency of the lowest carrier, and that only the right (higher frequency) border of the window is moved. After the window has reached its full width (100 kHz) the two borders are moved together, and thus the whole window is moved.

In the following is described how the invention may be applied for other multi-carrier systems than VDSL-systems, especially for ADSL. As already explained, ADSL allows an optimisation for the whole band width and therefore it is not necessary to use a window which is smaller than the total ADSL bandwidth. Therefore, in a first example of an application of the inventive idea for ADSL, the invention provides the following specific measure: the window width is defined to be the ADSL band width (especially 1.104 MHz) at the maximum. The inventive process or method starts with one (or very few) carrier/carriers within the window and with each movement of the window a further carrier (or few further carriers) comes into the window. The window, as explained above, may have its full width from the start of the bit allocation, or, as also explained before, increase in width by moving the higher frequency border only. In the latter case, in the moment when the last carrier (the $256^{th}$ carrier) has come into the window, the window has reached its full width. The window is not moved further, since no further carriers have to be brought into the window. Therefore, this application of the inventive idea to ADSL corresponds largely to the above mentioned start period in the bit allocation method for VDSL.

Though for ADSL it is not necessary to have a window width smaller than the total ADSL band width, it is possible and might be useful, to have a maximum width of the window which is smaller than the total ADSL band width. In such a case, a moving window is provided in a manner very similar to the bit allocation described above for VDSL. Possibly, the result of the computation of the bit allocation, if such a relatively small window is used, is not optimal and possibly the result becomes better the greater the width of the window is. Nevertheless it might be of advantage to have a possibility to use hardware and software designed primarily for VDSL or similar multi-carrier systems for ADSL.

The application of the inventive idea for ADSL has the advantage that the calculation time for the bit allocation, especially if iterations are avoided, is known in advance.

Advantages of the invention in its preferred embodiments and variants are the following:

The algorithm converges in spite of the high number of tones with a processing time known in advance.

A neglectable loss of capacity is the price for a stable bit allocation algorithm.

BRIEF DESCRIPTION OF THE FIGURES

Further features and advantages of the invention will be apparent from the following description of preferred variants and embodiments of the invention in connection with the drawings which show features essential for the invention, and in connection with the claims. The individual features may be realised individually or in any combination in an embodiment of the invention.

DETAILED DESCRIPTION OF THE FIGURES

Figure 1:
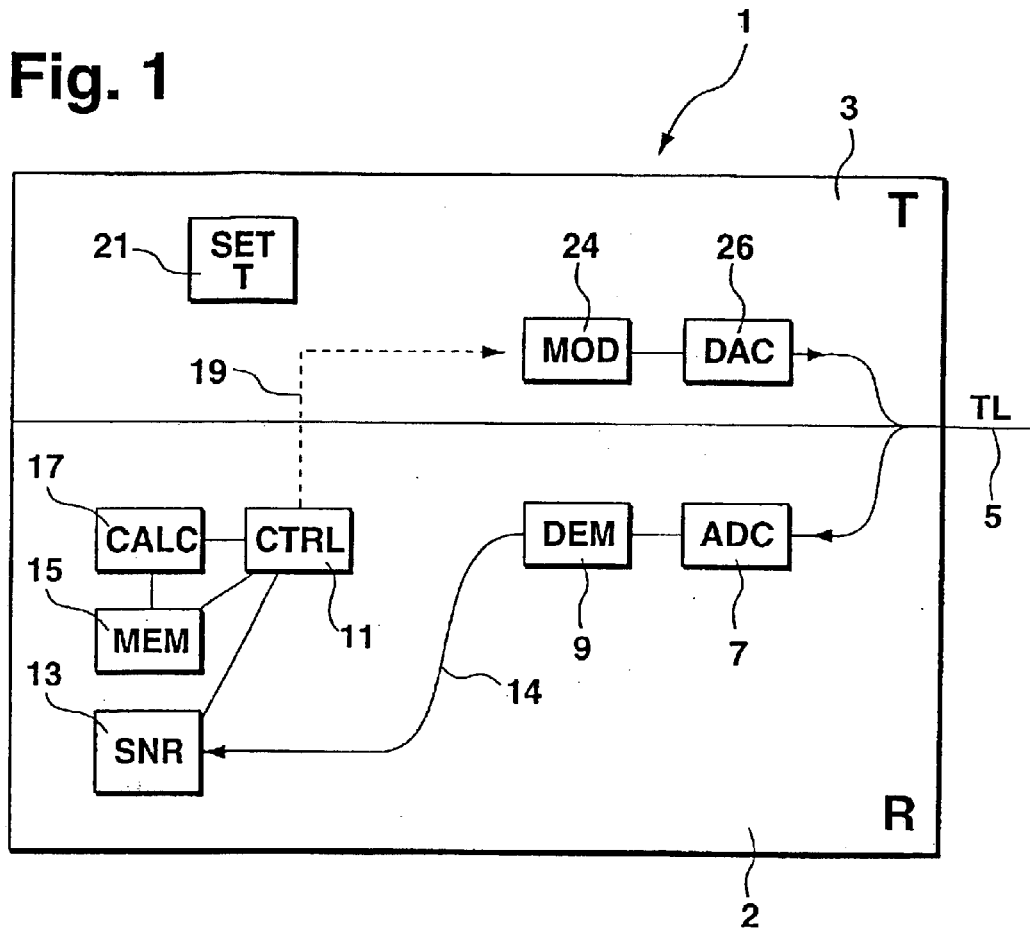
FIG. 1 shows a block diagram of a modem incorporating a device according to the invention performing an example of the method of the invention.

In FIG. 1 a modem 1 has a receiving portion (R) 2 and a sending portion (T) 3. Only few elements of usual modems are shown. A transmission line (TL) 5 is provided to make a connection to an other modem (not shown) of the point-to-point VDSL connection. In the receiving portion 2 the input terminal of an analogue to digital converter (ADC) 7 is connected to the transmission line 5. The output of the ADC 7 is connected to a demodulating device (DEM) 9. Further usual elements of the receiving portion are not shown, but the further elements of the receiving portion 2 in FIG. 1 are those necessary for performing the invention method.

These other elements are a control unit (CTRL) 11, a SNR measuring means (SNR) 13 receiving the output signal from DEM 9 via a connecting line 14, a memory (MEM) 15 and a calculation device (CALC) 17. The controlling element 11 controls the function of the last mentioned units 13, 15, 17. If necessary, the controlling element 11 together with its associated calculating device 17 may, in embodiments of the invention, also control the function of other elements of the receiving portion 2 and if wanted of the sending portion 3. The SNRs are measured for all the carriers by the SNR measuring means 13 and stored in the memory 15 first and then the bit allocation is computed by the processor built by units 11, 15, 17. The control 11 causes the calculation means 17 in connection with the memory means 15 to calculate bit loading values for the individual carriers within the window.

The calculation including optimisation is made as described above, namely in this example:

1 bit more than possible in view of the SNR is (provisionally) allocated to the new carrier;

in case the allowable power/average PSD is exceeded, it is tried to swap 1 bit to the new carrier from an other carrier within the window;

in case the allowable power/average PSD is yet exceeded, it is tried (instead of swapping) to reduce an other carrier within the window by 1 bit and corresponding power;

for the two last mentioned measures a carrier is searched according to the trade-off described below with reference to FIG. 2;

in case the allowable power/average PSD is yet exceeded, the new carrier is reduced step by step by 1 bit, until the allowable power/average PSD is no more exceeded.

As soon as in the procedure of the above paragraph the allowable power/average PSD is not exceeded, the calculation of the bit allocation of the present carrier is terminated.

The result (power and number of bits) of this calculation is stored in the memory 15 in a table. After the end of the bit allocation process for all carriers, the result is communicated to the other modem by information given from the control to the sending portion 3 of the modem 1 in FIG. 1 which fact is shown in the drawing by a broken line 19. The 2 tables of bit allocation (of the two modems) are exchanged in order to be applied by the other modem, respectively, for bit loading in operation of the point-to-point connection.

The fact that also the second modem performs a bit allocation and sends a corresponding information to the modem shown in FIG. 1 is not shown in the drawing. In that in the sending portion 3 of FIG. 1 this setting information from the other modem is used by setting T means (SET T) 21 for adjusting bit loading for that information which is sent by the sending portion T of the modem 1. In the sending portion 3 only few units necessary for sending are shown, namely a modulating device (MOD) 24 and a digital-to-analogue converter (DAC) 26, the output terminal of which is connected to the transmission line 5.

Figure 2:
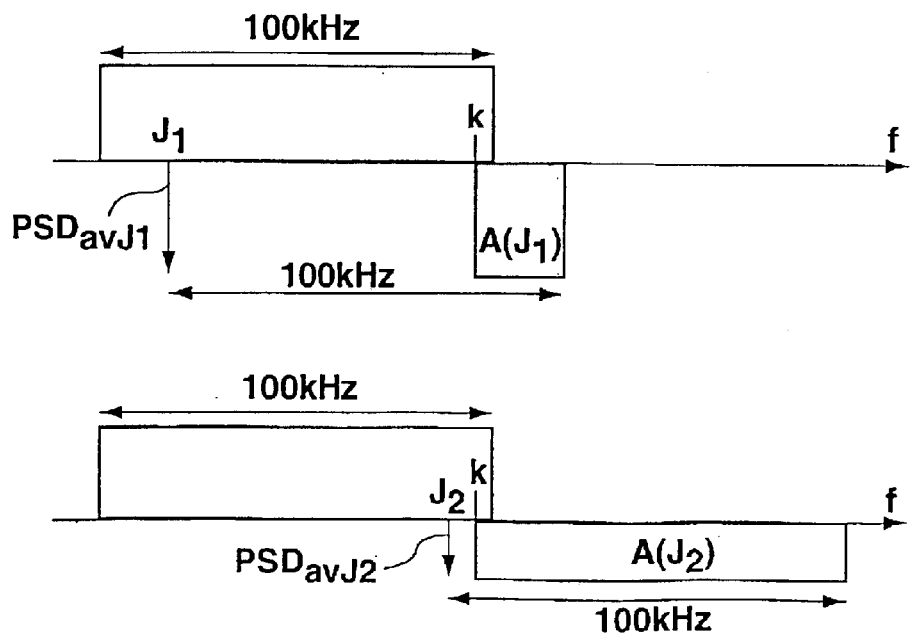
FIG. 2 is a diagram explaining the principle how the trade-off works.

In FIG. 2, a carrier J1 far from the new carrier (which is at position "k" at the higher frequency border of the window) is, when reduced in power, able to provide a relative great reduction PSDavJ1 in average PSD, but can influence only few carriers beyond the new carrier (which is in position "k"), i.e. in later positions of the window. A carrier J2 is nearer to the new carrier and can influence more carriers beyond the new carrier. Though in FIG. 2 the carrier J2 can provide, when reduced in power, less reduction (PSDavJ2) in average PSD compared with J1, its possible influence or benefit, expressed by the area A(J2)=PSDavJ2 * 100 kHz is greater than that (A(J1)) of carrier J1. This means that $Max(A(J_1), A(J_2))=A(J2)$. Therefore, the carrier J2 is chosen to be reduced in power. The left side border of each area A(J1), A(J2) is the position of the new carrier. The right side border of each area is the right side end of a frequency range according to the window width, the left side end of that range being at the position of that carrier (J1 or J2) which is under examination with respect to its influence to carriers of higher frequencies than the new carrier. The statement relating the right side border of each area is true as long as the number of future carriers covers at least a range of 100 kHz.

This will lose the average PSD requirement for the next window positions. Optimal bit allocation requires tailoring the PSD.

Because the noise on the low carriers strongly depends on the PSD (ISI/ICI effects) tuning the PSD will modify the noise. So, in order to avoid an iterative process (a succession of SNR measurement, bit allocation, SNR measurement, bit allocation, and so on) it is wise to prevent PSD update (in other words PSD change) in the lower part of the spectrum. A tiny loss of capacity due to non-optimal bit allocation in the lower part of the spectrum results. This is deemed to be tolerable in view of the relative simple calculation method.

Those carriers which have left the window at its back (the left side), are not changed in bit allocation or power any more in the present procedure of bit allocation for the entire frequency range. However, the invention includes methods and devices, which (e.g. for taking into account changes in noise in a point-to-point connection already in operation) perform an update of the bit allocation using the same inventive procedure and algorithm as described above, however starting, preferably, from those values of bit numbers and power of the carriers, which have already been calculated.

Instead of the standard and rules used as hereinabove, other regulations and rules may be chosen to be used as standard for a system in which the invention is realised.

What is claimed is:

1. A method for providing bit loading computation in a multi-carrier communication system, using a plurality of simultaneous different carriers, where the carriers are tones, the method comprising:
    measuring the signal to noise ratios for the carriers; and
    determining based on the signal to noise ratios a related number of bits to be loaded or allocated to a respective carrier,
    wherein said determining comprises:
        providing a sliding window having a frequency width comprising a predetermined number of the carriers,
        moving the sliding window over a frequency spectrum of the carriers through a plurality of positions of the window with respect to the carrier frequencies, the movement being such that after each movement at least one new carrier is positioned in the window, said at least one new carrier is in a current position next to a carrier that was previously positioned in the current position;
        when the window contains the predetermined number of the carriers and there is at least one further carrier to be positioned in the window as a new carrier for bit loading, the movement of the window being made such that on positioning the new carrier into the window at one of its frequency borders, a carrier already in the window at other frequency border leaves the window;
        for each position of the window determining bit allocation for a respective at least one carrier from the predetermined number of the carriers within the window;,
        in the event that a predetermined average power spectrum density threshold of the carriers over the window for the current window position is exceeded, selecting at least one carrier within the window for power spectrum density reduction at expense of at least one bit.

2. Method according to claim 1, wherein for at least one selected carrier different from the at least one new carrier, the number of bits is reduced by one, accompanied by a corresponding reduction of power of said selected carrier.

3. Method according to claim 1, wherein the selection of said at least one carrier is established according to a trade-off between available power spectrum density reduction of said selected at least one carrier and a number of next window positions that would benefit from a power spectrum density reduction of said selected at least one carrier, compared with the available power spectrum density reduction of other carriers and a number of next window positions that would benefit from a power spectrum density reduction of said other carriers.

4. Method according to claim 1, wherein one bit is moved to the new carrier from another carrier within the window lowering the average power spectrum density, said another carrier is selected such that the power removed from the another carrier is greater than the power to be added to the new carrier for the moved one bit.

5. Method according to claim 1, wherein said moving the sliding window comprises shifting in a direction from lower frequency tones to higher frequency tones.

6. Method according to claim 1, wherein the window width corresponds to the frequency range of all the carriers, and wherein the sliding window is moved such that during a plurality of movements the number of carriers in the window is smaller than the number of all the carriers.

7. Method according to claim 1, wherein the window width is smaller than the frequency range of all the carriers.

8. Method according to claim 1, wherein said selection of said at least one carrier is based on a trade-off between available power spectrum density reduction of said selected at least one carrier and a number of next window positions that would benefit from a power spectrum density reduction of said selected at least one carrier, compared with the available power spectrum density reduction of other carriers and a number of next window positions that would benefit from a power spectrum density reduction of said other carriers;

one bit is moved to the new carrier from an other carrier within the window in order to lower the average PSD, said other carrier being selected such that the power removed from that carrier for one removed bit is greater than the power to be added to the new carrier for one bit;

the moving of the sliding window comprises moving in a direction from lower frequency tones to higher frequency tones.

9. A modem for bit loading computation comprising:

means for measuring signal to noise ratios for carriers; and means for determining based on the signal to noise ratios a related number of bits to be loaded or allocated to a respective carrier of the carriers, wherein said determining comprises:

providing a sliding window having a frequency width comprising a predetermined number of the carriers, moving the sliding window over a frequency spectrum of the carriers through a plurality of positions of the window with respect to carrier frequencies, the movement being such that after each movement at least one new carrier is positioned in the window, said at least one new carrier is in a current position next to a carrier that was previously positioned in the current position, when the window contains the predetermined number of the carriers and there is at least one further carrier to be positioned in the window as a new carrier for bit loading, the movement of the window being made such that on positioning the new carrier into the window at one of its frequency borders, a carrier already in the window at other frequency border leaves the window, for each position of the window determining bit allocation for at least one respective carrier from the predetermined number of the carriers within the window, in the event that a predetermined average power spectrum density threshold of the carriers over the window for the current window position is exceeded, selecting at least one carrier within the window for power spectrum density reduction at expense of at least one bit.

10. Modem according to claim 9, wherein said computations further comprise:

for said at least one selected carrier different from said at least one new carriers, the number of bits is reduced by one, accompanied by a corresponding reduction of power of said selected carrier;

the selection of said at least one carrier is established according to a trade-off between available power spectrum density reduction of said at least one selected carrier and a number of next window positions that would benefit from a power spectrum density reduction of said at least one selected carrier, compared with the available power spectrum density reduction of other carriers and a number of next window positions that would benefit from a power spectrum density reduction of said other carriers;

moving one bit to the new carrier from an other carrier within the window in order to lower the average-power spectrum density, said other carrier being selected such that the power removed from the other carrier for one removed bit is greater than the power to be added to the new carrier for one bit;

said moving the sliding window comprises moving in a direction from lower frequency tones to higher frequency tones.

* * * * *